United States Patent [19]

Barney et al.

[11] 3,852,706

[45] Dec. 3, 1974

[54] OBJECT LOCATION SYSTEM

[75] Inventors: Harold L. Barney, Madison; Edward E. David, Jr., Berkeley Hts., both of N.J.

[73] Assignee: Bell Telephone Laboratories, Inc., New York, N.Y.

[22] Filed: June 10, 1955

[21] Appl. No.: 514,417

[52] U.S. Cl. ............... 340/6 R, 340/6 M, 340/16 R, 343/100 CL
[51] Int. Cl. ............................................. G01s 3/80
[58] Field of Search ......... 340/1, 2, 3, 6, 16, 174 D; 235/61 CF; 343/100 CL, 113 R

[56] References Cited
UNITED STATES PATENTS

| | | | |
|---|---|---|---|
| 2,262,931 | 11/1941 | Guanella | 250/11 |
| 2,688,124 | 8/1954 | Doty | 340/15 |
| 2,779,428 | 1/1957 | Silverman | 181/.5 |

FOREIGN PATENTS OR APPLICATIONS

| | | |
|---|---|---|
| 724,555 | 2/1955 | Great Britain |

OTHER PUBLICATIONS

Goff, "An Analog Electronic Correlator for Acoustic Measurements," March 1955, Journal of the Acoustical Society of America, Vol. 27, March 1955, pp. 223-236.

*Primary Examiner*—Richard A. Farley
*Attorney, Agent, or Firm*—R. O. Nimtz

EXEMPLARY CLAIM

1. Apparatus for locating a source of radiations through ambient noise of substantial strength, which comprises at least two transducers, spaced apart, means individual to each of said transducers for continuously recording its output on a recording medium, means for rapidly and repeatedly scanning each of said recording media to derive a time signal which is expanded in frequency and compressed in time as compared with that of said source, means for variously delaying one of said time signals relatively to the other, means for comparing said time signals for various values of said delay, means for deriving from said comparing means a measure of the degree of similarity of said time signals, whereby said measure reaches an extreme value when said time signals are coincident in time, and means for indicating the magnitude of said relative delay for which said measure attains said extreme value.

15 Claims, 5 Drawing Figures

INVENTORS H. L. BARNEY
E. E. DAVID, Jr.
BY
Harry C. Hart
ATTORNEY

OBJECT LOCATION SYSTEM

This invention relates to object location and particularly to the detection of sources of low level radiant energy, e.g., waves of sound which may be radiated into the surrounding sea water by a submarine boat.

Systems are well known in which sounds are picked up by two or more hydrophones spaced apart on a base line and in which comparison of the output of one hydrophone with that of another hydrophone permits determination of the bearing angle of the sound source as measured from the axis of the hydrophone array. The wave propagation path lengths from the sound source to the respective hydrophones may be compensated or equalized by the interposition of a controllable time delay in the output of at least one of the hydrophones, in which case the bearing may readily be determined by an indication, on a suitable scale, of the time delay thus introduced. For each particular value of the time delay, a beam of maximum sensitivity is, in effect, aimed in a particular direction; and variation of the time delay between preassigned limits effectively sweeps the beam through a bearing angle corresponding to those limits. A system of this character is shown, for example, in Hayes U.S. Pat. No. 1,470,733 granted Oct. 16, 1923.

When the sounds of the source as they reach the hydrophones are weak as compared with the level of ambient noise, as is the case when the submarine boat to be detected lies at a great distance from the hydrophones, a high degree of sensitivity is required of the detecting apparatus. Because such detection depends ultimately on the energy received from the sound source and because the available energy is proportional to the product of the sound power output of the source by the time interval in which the system is aimed at the source, the direction of aim must be altered very slowly in order to prevent a low level sound source in the field of view of the apparatus from escaping detection. But the price of such a slow bearing sweep is that another source, located at a bearing toward which the sensitivity beam is not aimed, may give forth a significant burst of sound which the apparatus, because of the slow change of aim, may fail to detect.

Accordingly, the principal object of the present invention is to maintain cognizance of the entire field of view, defined by the full bearing angle through which the sensitivity beam of the apparatus sweeps, without loss of the sensitivity which in conventional apparatus is achieved by a bearing sweep of sufficiently low speed.

This object is attained, in accordance with the present invention, by making a space pattern record, as on a magnetic tape or drum, of the output of each hydrophone, rapidly and repeatedly scanning each of these records to derive a time signal, introducing the required variable delay between these two derived time signals, and thereupon making a comparison between the derived time signals.

These steps are advantageously carried out by the interposition, in the output circuit of each hydrophone, of a recorder-multiplier which may comprise a drum or endless loop of magnetizable material which rotates, at a moderate speed, past a recording head. Just prior to the return of each part of the loop to the recording head, after nearly a full revolution, it passes an eraser which readies it to receive a new signal when next it passes the recording head. Thus each tape loop bears on all but a minor fraction of its length a space pattern counterpart of the hydrophone output which has taken place during the time in which the loop makes one revolution. Meanwhile a pick-up head rotates within the loop at a speed many times greater than the speed with which the loop itself turns. The pick-up head thus converts the space pattern wave into a number of almost identical time waves, the number being equal to the ratio of the speeds of rotation of the pick-up head and of the tape loop, respectively.

Evidently the recorder-multiplier increases the frequency of each component of the derived time signal as compared with the corresponding component of the incoming signal, and consequently increases the bandwidth of the signal by the same factor and reduces the time interval during which each part of the incoming signal exists by the same factor. Such time reduction, however, is not reflected in a loss of information because it is exactly compensated by the fact that each bit of information recorded on the space pattern is also contained in the derived time signal. Because the derived time signal is repeated many times, it can be compared with the other such signal in many different phases, thereby enabling the apparatus effectively to monitor a wide angle continuously.

The variable time delay, necessary for equalization of the propagation path lengths from the sound source to the hydrophones, is advantageously introduced into the derived time signal instead of the original time signal. Because, as described above, each time interval has been reduced by the frequency multiplication factor, the direction of maximum sensitivity of the pair of hydrophones may be steered through a given bearing angle by the introduction of a time delay which is less by this frequency multiplication factor than would be the time delay required to steer through the same bearing angle without the recorder-multipliers.

The time delay may be introduced in various different ways. In one embodiment of the invention the frequency-multiplied signal derived from one recorder-multiplier is passed through an electromagnetic wave propagation line having a plurality of lateral taps, and the signals appearing on these taps are sampled in succession by a commutator. In another embodiment the space phase of one of the rapidly rotating pick-up heads is shifted relatively to that of the other. The space phase difference may be introduced mechanically or electrically as by rocking the stator of the pick-up head drive motor. In either case the movement may be controlled by a cam, driven by a supplementary motor. In still another embodiment the pick-up heads remain in space phase coincidence while the space phase of the tape loops themselves is shifted. This condition may be realized by rocking the entire assembly including the tape loop, the recorder head and the eraser head as by a motor-driven cam.

For comparison of the derived time signals it is advantageous to multiply them together, to integrate the product and to form an indication of the integral. Such indication may advantageously be a mark delivered to a sheet of sensitive paper by an electrical stylus. The paper may advance in one direction in proportion to the time while the stylus is advanced in a perpendicular direction in proportion to the time delay introduced. Because the time delay which equalizes the propagation path lengths from the sound source to the hydrophones bears a known relation to the bearing angle of the sound source, the result is a continuous indication of the bearing of the sound source as a function of time.

While other means for effecting the comparison may be employed, multiplication of the two outputs together, followd by integration offers the advantage that coincidence in time of two derived signals gives rise to a maximum product and hence to a mark of high density on the recording paper even though the two derived signals may be of widely different amplitude levels.

The sweep angle through which, and the central bearing angle about which, the beam of maximum sensitivity is steered may readily be altered in the case of the second and third embodiments merely by substituting one cam for another.

The fundamental consideration on which the operation of the apparatus is based is that signal originating in a single sound source and traversing two paths to the two hydrophones are coherent in time. Equalization of the propagation path lengths in the fashion described above makes them coherent at the input points of the comparator. On the other hand the ambient undersea noise, which is of random origin, is incoherent and the function of the comparing apparatus is to distinguish the coherent part of the signal, originating at the sound source to be detected, from the incoherent part or noise. The signal-to-noise ratio may, however, be further improved by restricting the frequency bandwidth to which the apparatus is sensitive to that part of the frequency range which includes all frequency components of interest. While this does not exclude noise within the band it excludes noise outside of the band, thus broadly reducing the noise with which the detector has to contend.

For optimum performance the apparatus is advantageously designed to detect signals lying in a particular part of the frequency range e.g., a few cycles per second to 500 cycles per second. Occasions may arise in which the sounds of interest lie in a different part of the range e.g., 1,000 to 1,500 cycles per second. In such case the incoming signals may be translated on the frequency scale into the range for which the apparatus was designed as by the employment of a heterodyne modulator in each incoming singal path. For the preservation of proper phase relations as between the derived signals throughout the apparatus it is important that both of these heterodyne modulators be driven by a single carrier signal source.

The invention will be fully apprehended from the following detailed description of illustrative embodiments thereof in which.

Figure 1:
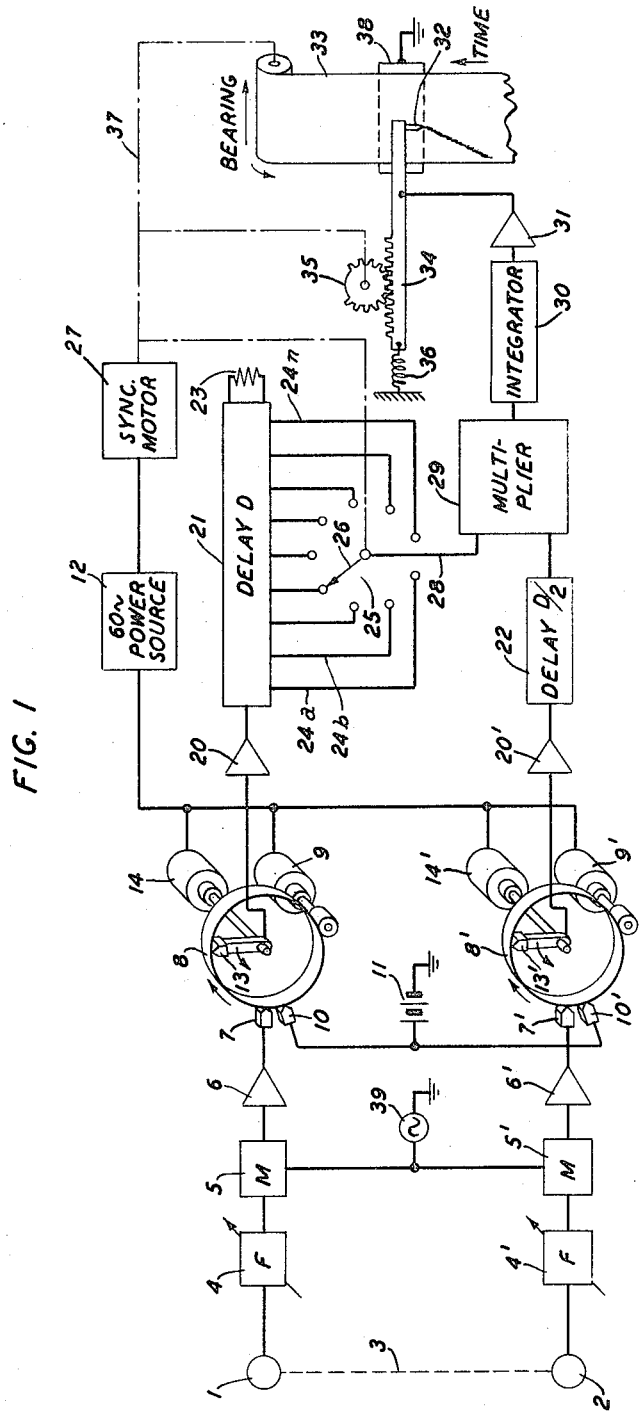
FIG. 1 is a schematic circuit diagram showing apparatus embodying the invention.

Referring now to the drawings, FIG. 1 shows signal detection apparatus in accordance with the invention comprising a pair of hydrophones 1, 2 spaced apart along a base line 3. It is to be understood that they are located in sea water in a locality of interest, for example several miles from the shore line. The spacing between these hydrophones may be of the order of one to five thousand feet.

The output signal derived from the first hydrophone 1 is passed through a bandpass filter 4, a modulator 5 whose purpose will be described below, and an amplifier 6 to a recorder head 7 past which a loop 8 of magnetizable tape, mounted on a supporting disc not shown, is rotated in the clockwise direction as by a motor 9. The speed of rotation of the tape loop 8 is fairly slow, e.g., one-half revolution per second. Thus there is formed on the tape loop 8 a space pattern record of the first hydrophone signal. That part of this record which appears on each point of the tape loop 8 remains on it until that point has completed nearly a full revolution when it passes under an eraser head 10 to which the energy of an erasing source 11 is applied. For the remainder of the revolution the tape loop 8 is wiped clean of its record, and is thus ready to receive a new record upon the completion of the full revolution.

Similarly, signals derived from the second hydrophone 2 are passed through a filter 4', a modulator 5' and an amplifier 6' and are applied by way of a second recorder head 7' on a second loop 8' of magnetizable tape to provide a second space pattern record. The second loop is likewise provided with an eraser head 10' supplied from the erasing source 11 and is driven for clockwise rotation like the first loop by a motor 9'.

To avoid undue complexity of the drawings the tape loop drives are shown as being effected by friction pulleys. It is important to preserve synchronism between the two tape loops 8, 8'. Hence, toothed gears or other mechanism for preserving phase relations may well be found advantageous in practice. For the same reason the motors 9, 9' which drive the tape loops are preferably synchronous motors driven from a common standard frequency source 12. If preferred, a single motor may be employed to drive both tape loops 8, 8' through appropriate coupling shafts.

As the two loops 8, 8' bearing their respective space pattern records, rotate, e.g., at speeds of about one-half revolution per second, pick-up heads 13, 13' are rotated much more rapidly within the loops, e.g., at speeds of 60 revolutions per second. These pick-up heads are maintained in space phase coincidence at all times as by coupling each of them to the output shaft of a synchronous motor 14, 14' driven from the standard frequency power source 12.

Each of the rapidly rotating pick-up heads 13, 13' is connected, e.g., by a rotary connector or slip ring not shown, and by way of such amplifying devices 20 as may be necessary, to a delay device 21, 22. These connections result in applying to the respective delay devices 21, 22 the time-variant signal derived from the space pattern record of the hydrophone signal on the magnetic tape 8 or 8'.

The delay device connected to the upper pick-up head 13, which may be of any desired type, is shown by way of illustration as an electromagnetic delay line 21 terminated at its far end in well-known fashion for no reflection by a load 23, and provided with a number of equally spaced lateral taps 24a, 24b and so forth. It may for example comprise 240 similar reactive sections having 120 equally spaced taps, i.e., one located at every other section. In terms of propagation time along this delay line the spacing between each tap and the next one may be 20 microseconds, the total delay for all 240 sections being thus 2.4 milliseconds.

Each of these taps is connected to a segment of a commutator 25 whose wiper arm 26 sweeps over these segments in succession making a full revolution in 2 seconds, during which period each of the pick-up heads 13, 13' has accomplished 120 scans, one for each tap of the delay line 21. Movement of the commutator wiper arm 26 is synchronized with the movements of the pick-up heads 13, 13' by mechanical coupling to a synchronous motor 27 driven by the standard frequency power source 12. A conductor 28 connected to the wiper arm 26 thus carries a sequence of samples of the signal derived by the first pick-up head 13, each of which samples lags its predecessor by 20 microseconds. These samples are passed to one input point of a multiplier 29.

The delay device 22 connected to the lower pick-up head 13' is proportioned to introduce a delay equal to one half of the total delay introduced by the delay device 21. Thus, when the wiper arm 26 makes contact with the central tap of the delay line 21, the delay introduced in the lower path balances that introduced in the upper path. The lower delay device 22 may thus comprise 120 similar reactive sections and may introduce a total delay of 1.2 milliseconds.

The output of the lower delay device 22 is applied to the second input point of the multiplier 29. The multiplier continually forms the product of the signals applied to its two input points. The output of the multiplier 29 is averaged over a time of the order of one-sixtieth second as by an integrator 30, and the output of the integrator 30 is applied by way of marking amplifier 31 to a recorder. One suitable recorder comprises a stylus 32 which is moved from one margin of a strip 33 of sensitive paper, such as Western Union "Teledeltos" paper, to the other margin in the same time, i.e., 2 seconds, as is occupied by the commutator wiper 26 in accomplishing one full commutator revolution. The stylus 32 may be advanced by a rack 34 driven by a gear 35 bearing teeth throughout a part only of its periphery, the gear 34 being in turn driven by the synchronous motor 27. When the last tooth of the gear 35 leaves the rack 34 the stylus 32 is returned to its starting position by a spring 36. Meanwhile the sensitive paper 33 is continuously led by a drive 37 past the stylus 32 and over a plate 38 which may be grounded. As a result, the current entering the stylus 32 from the marking amplifier 31 traverses the paper 33 to the plate 38 as a spark discharge whose intensity is substantially proportional to the output of the integrator 30. This process forms a mark on the paper 33 whose density is related to the product of the outputs of the two pick-up devices 13, 13'. Inasmuch as this product is maximized when the difference between the delays introduced in the two paths by the devices 21, 22, is such as exactly to equalize the propagation delay as between signals reaching the two hydrophones 1, 2, while the lateral position of the stylus 32 on the paper 33 is proportional to this delay, the lateral location on the paper of the mark of the greatest density gives an indication of the bearing of a distant source whose sound is picked up by the two hydrophones 1, 2. As the plotting paper 33 advances with time any change in the location on this paper of the mark of maximum density constitutes an indication of a change in the bearing of this sound source.

A recorder-multiplier can readily be constructed and operated to receive and store records of incoming signals lying in the range of a few to 500 cycles per second without significant attenuation or distortion. For signals much above this range, however, and because of the slow speed of rotation of the tape loops 8, 8' the recorded signals are somewhat attenuated in the process of recording and reproduction. To avoid these effects a modulator 5, 5' may be interposed in the path between each hydrophone 1, or 2 and the recorder-multipliers 7, 8, 13 or 7', 8', 13'. It operates to translate incoming signals on the frequency scale into the low frequency range, e.g., the range from a few to 500 cycles per second. This becomes possible, of course, at a sacrifice of the simultaneous recording of signals covering a band much broader than 500 cycles per second. In many cases signals in the range 0 to 500 cycles per second are of interest, and in many other cases signals in a different range, e.g., in the range 1,000 to 1,500 cycles per second are of interest. In such cases the heterodyne modulation technique preserves the quality of the stored record of the incoming signals.

To preserve the coherence between the recorded signals as thus modulated the two modulators are advantageously energized by a common carrier frequency source 39.

By connecting the hydrophones to a second set of apparatus like that of FIG. 1, with its filters and modulators adjusted to pass a different frequency band, a second plot may be produced displaying the same bearing sector and thus indicating the presence in that sector of sound sources radiating a spectrum different from that of sources shown on the first plot.

Figure 2:
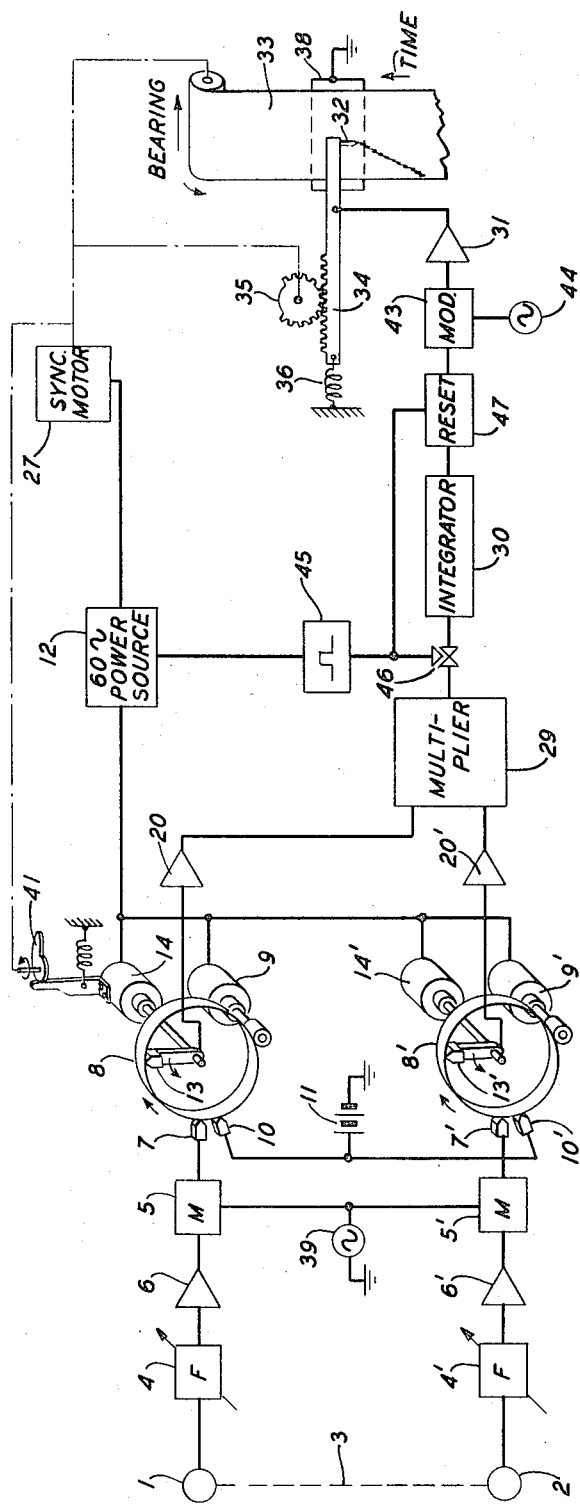
FIG. 2 is a schematic circuit diagram showing a modification of the apparatus of FIG. 1.
Figure 3:
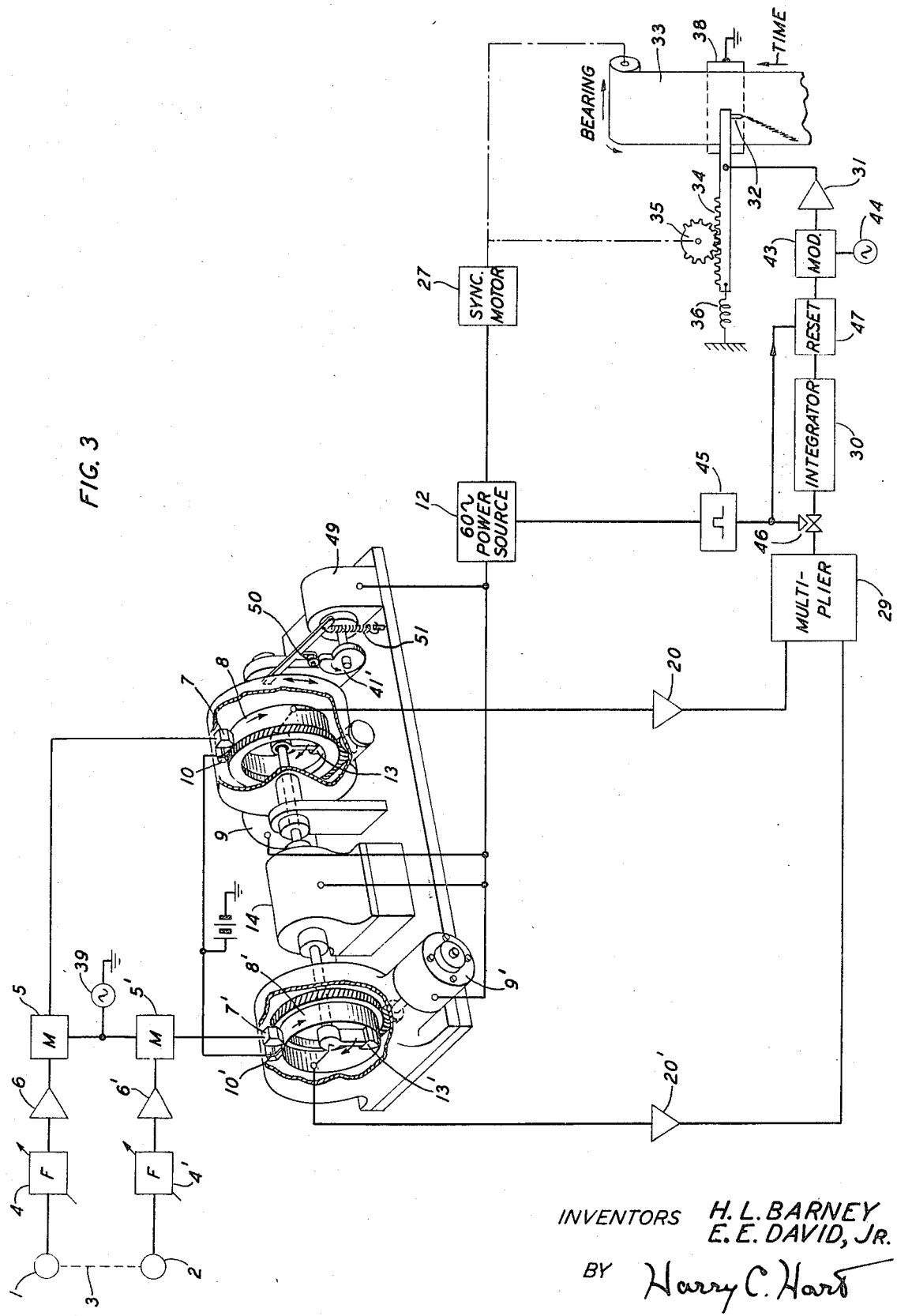
FIG. 3 is a diagram, partly in perspective and partly schematic, showing another modification of the apparatus of FIG. 1.

In the embodiment of FIG. 1, the relative delays between the derived signal from recording tape 8 and recording tape 8' are obtained by synchronously recording and scanning the two tapes and introducing appropriate electrical delays into the signals picked up by scanning heads 13 and 13'. The same time relationships between the derived signals may be obtained by mechanically varying the space phase relationships of the signals as they are picked up, i.e., by varying the phase relationships of the scanning heads with respect to the tape-recorder assemblies or, conversely, by varying the phase relationships of the tape-recorder assemblies with respect to the scanning heads. These alternatives are illustrated in FIGS. 2 and 3, respectively. The essential feature of all of these arrangements, however, is that ultimately two signals are derived, one of which is fixed in time and the other of which is subjected to variable delay, thus permitting a comparison between the two derived signals over the interval of interest.

FIG. 2 shows a modification in which the variable delay introduced by the commutator 25 of FIG. 1 is replaced by a similarly variable phase displacement between the pick-up heads 13, 13' which scan the records on the tape loops 8, 8'. This phase displacement may conveniently be introduced by rocking the stator of the synchronous motor 14 which drives one of these pick-up heads 13. The hydrophones 1, 2, the filters, the modulators, the recording heads, the erasing heads, the drum drive motors and the scanning pick-up drive motors 4–10, 4'–10' may be the same as in FIG. 1. The stator of the motor 14 may be rocked as by a cam 41 coupled by way of a shaft to a synchronous motor 27 driven by the standard frequency power source 12'. The outputs of the pick-up heads 13, 13' are applied as before to the respective inputs points of a multiplier 29 whose output is averaged as before by an integrator 30. As before, the integrator output is applied to a stylus 32 which is driven, synchronously with the phase displacement of the pick-up head 13', laterally across a strip 33 of moving sensitive paper by a rack and gear arrangement 34, 35, 36 like that of FIG. 1.

As a refinement, a modulator 43 is interposed between the integrator 30 and the marking amplifier 31, and the voltage of a carrier source 44 is applied to it. This causes the polarity of the spark discharge through the paper 33 to alternate rapidly, and this simplifies the design of the marking amplifier 31.

As another refinement, a pulse generator 45 driven by the standard frequency power source 12, applies pulses, one for each revolution of the pick-up heads 13, 13' to the control terminal of a switch 46 whose conduction terminals are connected in series between the output terminal fo the multiplier 29 and the input terminal of the integrator 30. The control pulse endures from an instant before the pick-up head 13 reaches the erase head 10 until after it has passed the recorder head 7. The action is thus to prevent the application of undesired transient signals to the integrator. At the same time the pulse generator applies its output pulses to a resetting unit 47 which restores the integrator output to zero value at the conclusion of each revolution of the pick-up heads.

FIG. 3 shows apparatus in which the required variable time delay is introduced by rocking the entire assembly comprising one of the magnetically sensitive tape loops 8, its recording head 7 and its erasing head 10. The rocking is accomplished by a supplementary synchronous motor 49 driven from the standard frequency power source 12 and driving a cam 41', e.g, through a gear reduction box not shown at one half revolution per second. A cam-follower 50 fixed to the assembly housing is urged against the periphery of the cam 41 by a spring 51. With this arrangement the two pick-up heads 13, 13' may be coupled together as by a common shaft, being driven as by a synchronous motor 14 controlled by the standard frequency power source 12. This arrangement offers the advantage that only the low speed apparatus components take part in the rocking movement, the high speed pick-up heads 13, 13' being allowed to rotate at uniform speed, and in fixed space phase relation at all times.

The remainder of the apparatus of FIG. 3 may be identical with that of FIG. 2 and similar apparatus components are similarly numbered.

Figure 4:
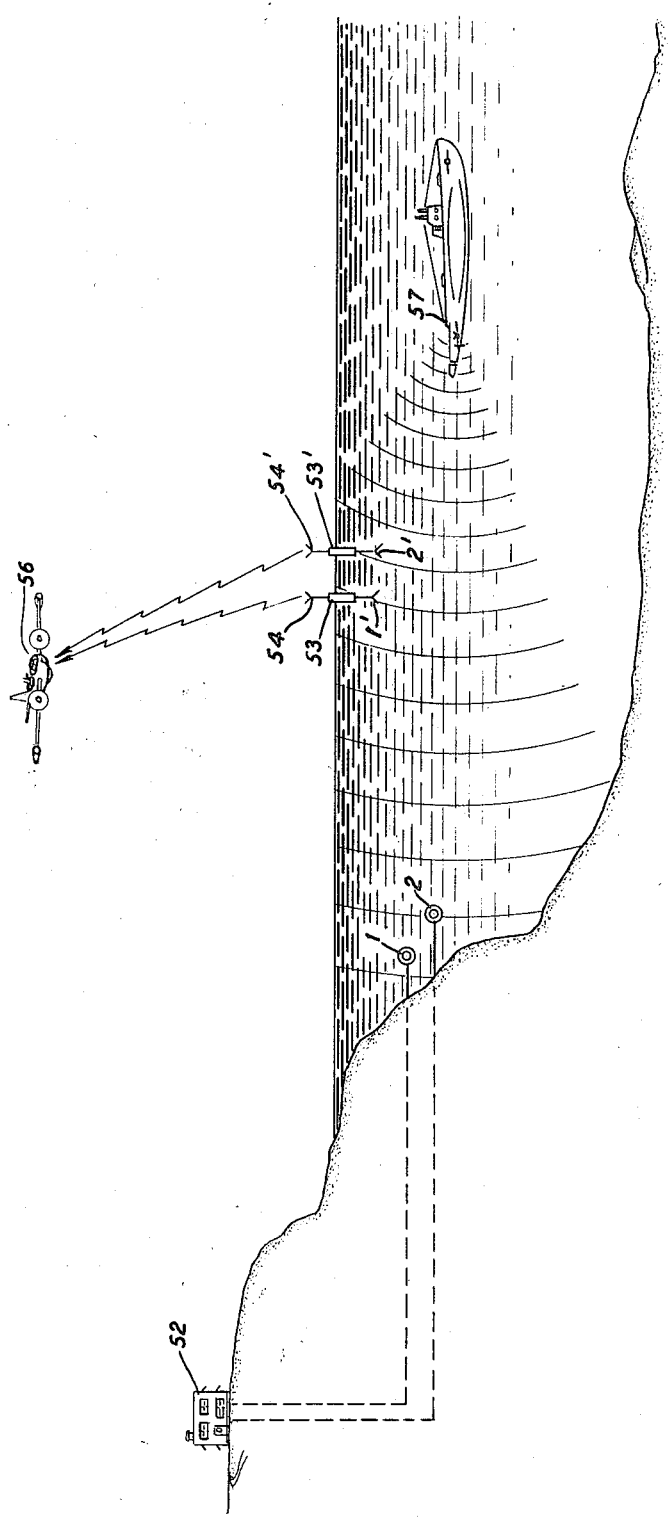
FIG. 4 is a perspective view illustrating the use of the apparatus of the invention.

The invention may readily be employed to determine the bearing of a distant object from two widely separated points, and thus obtain a fix. Such an arrangement is depicted in FIG. 4 which shows two hydrophones 1, 2 fixed off shore under water and connected to apparatus 52 which may be shown in FIGS. 1, 2 or 3. It also shows two buoys 53, 53' from the lower end of each of which is suspended a hydrophone 1', 2', while a radio antenna 54, 54' extends from the upper end of each. Each buoy 53, 53' may contain an amplifier, a radio frequency generator and a transmitter, and may broadcast into the air signals picked up by the suspended hydrophones 1', 2'. These may be received as by an aircraft 56 which may contain the apparatus of the invention with the sole exception that the hydrophones are replaced by radio receiving and detecting units. With an arrangement of this character the shore station 52 determines the bearing of an object such as a submarine boat 57 with respect to the shore-mounted hydrophones 1, 2 while the apparatus carried by the aircraft 56 determines its bearing with respect to the buoyed hydrophones 1', 2'. As is well known in the art of navigation, two bearing lines determine a fix. Hence, the actual location of the object 57, as distinct from its bearing alone, may be determined by communication between the airplane and the shore station, or between two shore stations or between two aircraft, and so forth.

Figure 5:
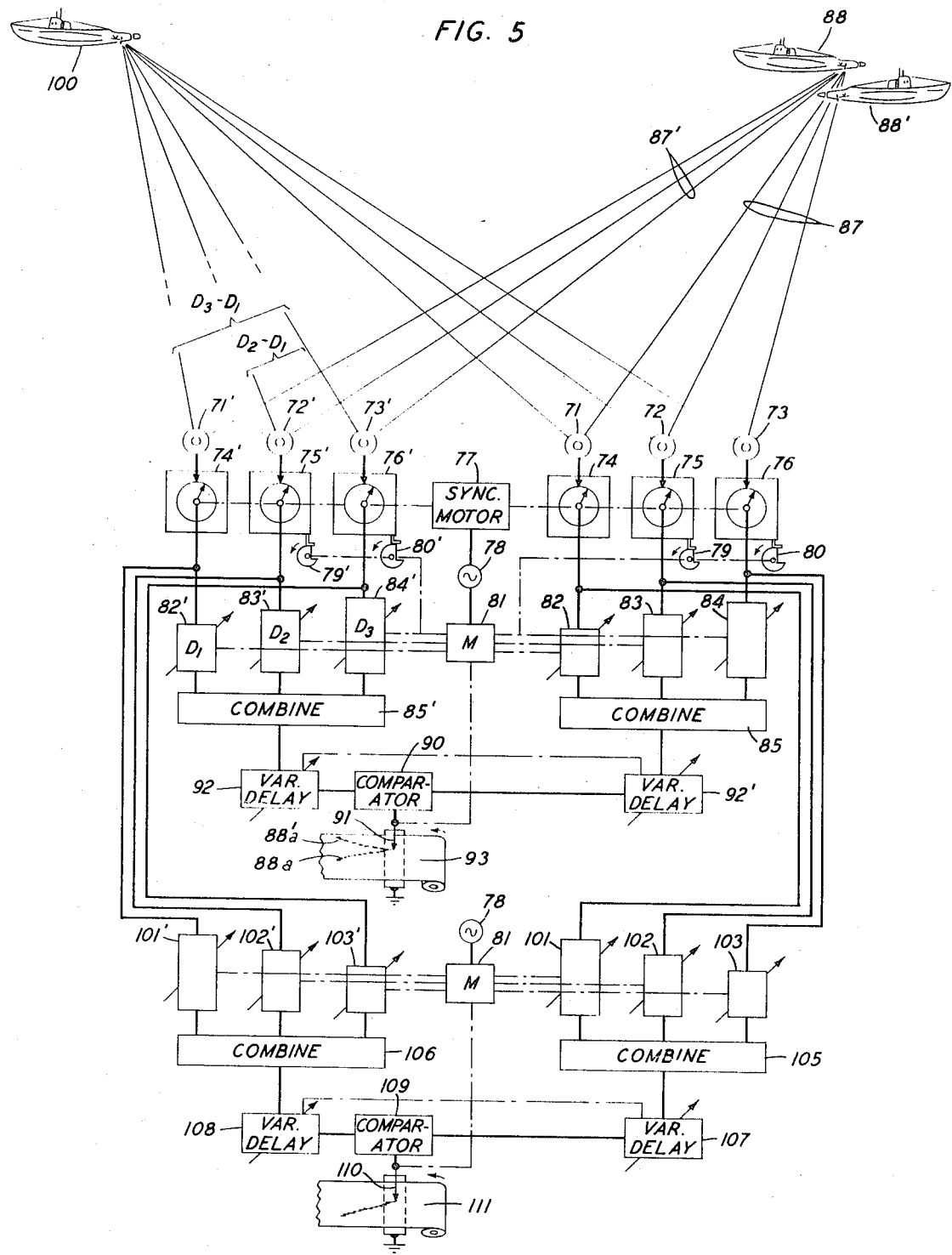
FIG. 5 is a schematic circuit diagram illustrating an extension of the invention to a multiplicity of energy receiving devices.

The recorder-multipliers and the signal comparison apparatus components described above may advantageously be combined in various ways to produce greater flexibility and sensitivity. An example of such combination is illustrated in FIG. 5, which shows three hydrophones 71, 72, 73 spaced apart along a line, and thus constitute a first array, connected respectively to the recording heads of three recorder-multipliers 74, 75, 76. Each of these may comprise a loop of tape which is rotated slowly, through means not shown, and within which a pick-up head is rotated rapidly, all as shown in greater detail in FIGS. 1, 2, and 3. The eraser heads and the driving motors, equally required in FIG. 5 are omitted to avoid complexity of the drawings. As in FIG. 3, the pick-up heads may be directly coupled together, being driven by a synchronous motor 77 energized from a standard frequency source 78. The stator of one of the recorder-multipliers may remain fixed to its frame, the stator of the second one being rocked through an angle as by a cam 79 while the stator of the third one is rocked through a greater angle as by a larger cam 80. These cams are together driven by a second synchronous motor 81.

The outputs of the three recorder-multipliers 74, 75, 76 are applied to three variable delay devices 82, 83, 84 and the outputs of these delay devices are applied to a combining network 85, for example an adding network. Each of the delay devices may be a wave propagation line having lateral taps as in FIG. 1 and a distributor for picking signals off the several taps in succession. On the other hand, it may equally well comprise a moving sensitive medium such as a magnetic tape with a recorder head at one point and a pick-up head at a different point, and provision for varying the spacing between these heads. Apparatus of this character is shown, for example, in Dudley U.S. Pat. No. 2,115,803 and in Graham U.S. Pat. No. 2,306,435. Whatever the construction of the delay devices, the delays which they introduce are to be varied in synchronism, and to this end FIG. 5 shows mechanical couplings from the synchronous motor 81 to the several control elements of these delay devices 82, 83, 84.

This arrangement constitutes a steerable array, and adjustment of the delay devices 82, 83, 84 and the cams 79, 80, aim a beam 87 of high sensitivity in a particular direction, e.g., toward a distant target 88. The beam may be steered by rotation of the cams 79, 80, which rock the stators of the recorder-multipliers or by variation of the delay devices 82, 83, 84, or both. The delay devices are included in order that the sensitive beam 87 may be steered through a wide angle without requiring an excessive amount of rocking of the stators.

A similar array of three hydrophones 71', 72', 73' each followed by a recorder-multiplier 74', 75', 76' and a delay device 82', 83', 84' is shown at the right-hand portion of the figure. The outputs of the three delay devices are applied to a second combining network 85' which, again, may be an adder. As before, the pick-up heads of the recorder-multipliers are arranged to rotate at high speed as by a direct coupling to the synchronous motor 77 while the stators of two of these devices are arranged to be rocked as by cams rotated by the second synchronous motor 81. Similarly, the several delays introduced by the three devices are varied in coordination by the second motor 81. This arrangement produces a high sensitivity beam 87' which may be directed toward the target 88.

For a given adjustment of the delay devices and the cams this array may be steered, like the first array toward the same target. The two arrays may well be separated by a distance of many miles. Hence, when the beams 87, 87' of these two arrays are aimed toward the target 88 they are not necessarily aimed along the same bearing lines. Indeed the bearing angles are alike only when the distance separating the target from each array is many times greater than the distance separating the two arrays.

A precise indication of the bearing of the target with respect to a convenient point on the base line is achieved by feeding the outputs of the two combining networks to a comparator 90 whose output terminal is connected to the stylus 91 of a recorder. The recorder may comprise a slowly moving strip 93 of sensitive paper which is marked by a spark discharge from the stylus as in FIGS. 1, 2 and 3, to provide a plot. The comparator preferably comprises a multiplier followed by an integrator so that, as described above, the darkest mark is made on the paper when signals of the same character reach the two input points of the comparator 90 at the same instants of time. A variable delay device 92, 92', which may be of any of the types described above, is interposed in series with each input of the comparator 90 and the delay which it introduces is controlled by the shaft of the synchronous motor 81 and synchronized with the movement of the stylus 91 across the paper. These two variable delay devices taken together constitute means for steering the bearing angles of the beams 87, 87' of the two arrays through wide ranges, and thus toward any selected target lying within this wide angle.

The employment of an array of two or more hydrophones as in FIG. 5 in the place of each of the single hydrophones of FIGS. 1, 2 and 3 furnishes "array gain" and so improves the signal to noise ratio and the detection threshold of the system. A system of this character is capable of recognizing two targets 88, 88' which are momentarily sufficiently close together to be within the range of the sweep of the array beams 87, 87' as governed by the oscillatory movements of the stators of the recorder-multipliers and the corresponding alterations of the delay devices. Under such conditions an indication, 88a and 88'a of each of the two targets is produced in the plot on the paper strip 93.

For the highest sensitivity the oscillator sweep of each array beam 87, 87' should be restricted to an angle which is narrow as compared with the entire field through which these beams may be steered. Consequently the system shown, if adjusted for highest sensitivity, might fail to recognize another target 100. However, because the individual hydrophones 71 through 73' have nondirectional characteristics this other target 100, lying in a widely different quarter from the first two targets, may be recognized, simultaneously with the recognition of the first two targets 88, 88' by the connection, to the output points of the recorder-multipliers, of additional beam steering apparatus. This may comprise two further groups of three delay devices 101 through 103' the outputs of the first three being combined as before by a network 106, the combined outputs being applied through variable delay devices 107, 108 to a comparator 109 whose output is applied to a stylus 110 past which a second strip 111 of sensitive paper is moved. The variations of the delay devices 107, 108 are again synchronized with the movement of the stylus 110 across the paper 111 and with the variations of the delay devices 101 through 103' of the first group. To this end, these elements may all be driven by the synchronous motor 81 energized by the same standard frequency source 78.

With the above in mind it will readily be seen to be possible to provide a large number of beams of high sensitivity, to aim them in various directions, to sweep them through various angles, large or small, in dependence on the resolution required of the system, maintaining complete surveillance of the entire field of search, to compare the outputs of the several arrays in pairs, and to provide a plot for each pair indicating the bearing of a target which may appear at the point of intersection of two such beams.

As stated above, when the target distance is large compared with the spacing between the two hydrophones of FIGS. 1, 2 and 3, or between the two arrays of FIG. 5, the plot gives the target bearing directly. When, however, the distance of the target is of the same order of magnitude as the spacing or smaller, the target bearing is given indirectly by the location of the mark of greatest density on the plot. The mathematical relation which holds between delay time, as directly indicated on the plot, and target bearing is a hyperbolic one exactly as in the case of a LORAN Navigation System. Hence, the determination of target bearing, from the indication on the sensitive paper, presents no difficulty, even in the case of a target which is close by.

While the invention has been described in terms of an illustrative embodiment in the field of location of objects submerged in the sea through the agency of sounds generated by such objects and transmitted as sound waves through the sea as a wave supporting medium to two or more hydrophones, the invention itself is evidently not so restricted but is applicable, on the contrary, to waves of any type and of any frequency transmitted through any wave supporting medium and recovered by transducers of appropriate character.

What is claimed is:

1. Apparatus for locating a source of radiations through ambient noise of substantial strength, which comprises at least two transducers, spaced apart, means individual to each of said transducers for continuously recording its output on a recording medium, means for rapidly and repeatedly scanning each of said recording media to derive a time signal which is expanded in frequency and compressed in time as compared with that of said source, means for variously delaying one of said time signals relatively to the other, means for comparing said time signals for various values of said delay, means for deriving from said comparing means a measure of the degree of similarity of said time signals, whereby said measure reaches an extreme value when said time signals are coincident in time, and means for indicating the magnitude of said relative delay for which said measure attains said extreme value.

2. Apparatus as defined in claim 1 wherein each of said recording media comprises a magnetically sensitive medium formed into an endless loop, and said recording means includes a recording element and an erasing element juxtaposed with said loop, and means for rotating said loop past said elements.

3. Apparatus as defined in claim 1 wherein said delaying means comprises a wave propagation device having a plurality of lateral taps and means for collecting the signals appearing at said taps in ordered succession for applying them to a common point.

4. Apparatus as defined in claim 1 wherein said delaying means comprises means for varying the phase of the scanning of one of said recording media as compared with the phase of the scanning of the other of said recording media.

5. Apparatus as defined in claim 1 wherein said delaying means comprises means for varying the space phase of one of said scanning means relative to that of the other.

6. Apparatus as defined in claim 2 wherein said delaying means comprises means for varying the space phase of one of said endless loops in the course of its rotation as compared with the space phase of the other of said endless loops in the course of its rotation.

7. In combination with apparatus as defined in claim 2, means for recurrently disabling said degree of similarity deriving means throughout an interval which includes the entire interval during which the scanning means deriving said time signal from one of said magnetic loops lies between the recording element and the erasing element which are juxtaposed with the endless loop.

8. In combination with apparatus as defined in claim 1, a first modulator having a first input point connected to one of said transducers and an output point connected to one of said recording means, a second modulator having a first input point connected to another of said transducers and an output point connected to another of said recording means, each of said modulators having also a second input point, and a source of carrier frequency oscillations connected to the second input point of each of said modulators.

9. Apparatus as defined in claim 1 wherein said comparing means comprises means for multiplying said time signals together to form a product.

10. Apparatus as defined in claim 1 wherein said comparing means comprises means for multiplying said time signals together to form a product and means for integrating said product over a time substantially equal to the time for a single traversal of one of said recording media by one of said rapid scanning means.

11. Apparatus for locating a source of radiations through ambient noise of substantial strength which comprises a first plurality of transducers spaced apart by distances $L_1$ along a first base line, a second plurality of transducers spaced apart by distances $L_2$ along a second base line, each of said pluralities comprising an array, said arrays being spaced apart by a distance $L_3$ along a third base line, means connected to each of said transducers for equalizing the wave propagation path lengths from said source to the outputs of the individual ones of said equalizing means of each of said arrays, means for combining the outputs of the several ones of said equalizing means connected to the transducers of said first array to form a first combined output, means for combining the outputs of the several one of said equalizing means connected to the transducers of said second array to form a second combined output, means for variously delaying one of said combined outputs with respect to the other combined output, means for comparing one of said combined outputs with the other combined output, and means for indicating the magnitude of said delay for which said comparison indicates maximum similarity between said combined outputs.

12. In combination with apparatus as defined in claim 11, means for synchronously varying the equalized path lengths of the first array, thereby to sweep a sensitivity beam of the first array through a preassigned angle, means for synchronously varying the equalized path lengths of the second array, thereby to sweep a sensitivity beam of the second array through another angle, means for varying the delay of one of the combined outputs with respect to the other combined output, and means for synchronizing said delay variation with both of said path length varying means, thereby to maintain the point of intersection of said two array beams at a preassigned relative location from said arrays.

13. Apparatus for locating a source of radiations through ambient noise of substantial strength which comprises a first plurality of transducers spaced apart by distances $L_1$ along a first base line, a second plurality of transducers spaced apart by distances $L_2$ along a second base line, each of said pluralities comprising an array, said arrays being spaced apart by a distance $L_3$ along a third base line, means for continuously recording the output of each of said transducers on a recording medium, means for rapidly and repeatedly scanning each of said recording media to derive a time signal which is expanded in frequency and compressed in time as compared with that of said source, means connected to each of said transducers for equalizing the wave propagation path lengths from said source to the outputs of the individual ones of said equalizing means of each of said arrays, means for combining the outputs of the several ones of said equalizing means connected to the transducers of said first array to form a first combined output, means for combining the outputs of the several ones of said equalizing means connected to the transducers of said second array to form a second combined output, means for variously delaying one of said combined outputs with respect to the other combined output, means for comparing one of said combined outputs with the other combined output, and means for indicating the magnitude of said delay for which said comparison indicates maximum similarity between said combined outputs.

14. In combination with two time signal sources, apparatus for rapidly determining the degree of similarity of the signals of said sources which comprises means for storing the output of each of said sources for a preassigned interval on a recording medium, means for rapidly and repeatedly scanning each of said recording media to derive time signals each of which contains the same information as one of said original time signals but on a telescoped time scale, means for variously delaying one of said derived time signals relatively to the other, means for comparing said derived time signals for various values of said delay, means for deriving from said comparing means a measure of the similarity of said time signals, whereby said measure reaches an extreme value when said original time signals coincide in phase, and means for indicating the magnitude of said relative delay for which said measure attains said extreme value.

15. Apparatus as defined in claim 14 wherein said comparing means comprises means for multiplying said time signals together to form a product and means for integrating said product over a time substantially equal to the time for a single traversal of one of said recording media by one of said rapid scanning means.

* * * * *